(12) United States Patent
Glick et al.

(10) Patent No.: US 9,437,974 B2
(45) Date of Patent: Sep. 6, 2016

(54) ELECTRICAL TERMINAL

(71) Applicant: Lear Corporation, Southfield, MI (US)

(72) Inventors: Michael Glick, Farmington Hills, MI (US); Slobodan Pavlovic, Novi, MI (US); Brantley Natter, Brighton, MI (US); Tulasi Sadras-Ravindra, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/431,142

(22) PCT Filed: Oct. 21, 2013

(86) PCT No.: PCT/US2013/065900
§ 371 (c)(1),
(2) Date: Mar. 25, 2015

(87) PCT Pub. No.: WO2014/063142
PCT Pub. Date: Apr. 24, 2014

(65) Prior Publication Data
US 2015/0255924 A1  Sep. 10, 2015

Related U.S. Application Data

(60) Provisional application No. 61/716,000, filed on Oct. 19, 2012.

(51) Int. Cl.
*H01R 13/40* (2006.01)
*H01R 13/642* (2006.01)
*H01R 13/18* (2006.01)

(52) U.S. Cl.
CPC ............ *H01R 13/642* (2013.01); *H01R 13/18* (2013.01)

(58) Field of Classification Search
CPC ... H01R 13/642; H01R 13/18; H01R 13/113
USPC ...................................................... 439/733.1
See application file for complete search history.

(56) References Cited

U.S. PATENT DOCUMENTS

| | | |
|---|---|---|
| 4,040,713 A | 8/1977 | Könnemann |
| 4,540,234 A | 9/1985 | Könnemann et al. |
| 4,540,235 A | 9/1985 | Lolic |

(Continued)

FOREIGN PATENT DOCUMENTS

| | | |
|---|---|---|
| CN | 202094365 U | 12/2011 |
| CN | 103996918 A | 8/2014 |

(Continued)

OTHER PUBLICATIONS

PCT International Search Report and the Written Opinion, Application No. PCT/US2013/065900 filed Oct. 21, 2013, dated Feb. 12, 2014.

*Primary Examiner* — Jean F Duverne
(74) *Attorney, Agent, or Firm* — MacMillan, Sobanski & Todd, LLC (57) ABSTRACT

An electrical terminal assembly includes a connector body having a passageway formed therein and an electrical terminal. The electrical terminal includes a contact portion having a contact arm and a spring arrangement having a spring arm engaged with the contact arm. The electrical terminal assembly further includes a one way installation feature preventing the electrical terminal from being inserted into the passageway in an incorrect orientation.

19 Claims, 8 Drawing Sheets

(56) References Cited

U.S. PATENT DOCUMENTS

| | | | |
|---|---|---|---|
| 4,583,812 A | 4/1986 | Gross, Jr. et al. | |
| 4,932,877 A * | 6/1990 | Zinn | H01R 13/18 439/839 |
| 5,007,865 A | 4/1991 | Jakobeit | |
| 5,064,379 A | 11/1991 | Ryll et al. | |
| 5,080,604 A | 1/1992 | Rider et al. | |
| 5,147,230 A | 9/1992 | Plyler et al. | |
| 5,334,058 A | 8/1994 | Hotea | |
| 5,413,506 A | 5/1995 | Thompson | |
| 5,415,571 A | 5/1995 | Lutsch | |
| 5,437,566 A * | 8/1995 | Zinn | H01R 13/113 439/839 |
| 5,558,547 A | 9/1996 | Breitschaft et al. | |
| 5,573,434 A | 11/1996 | Ittah et al. | |
| 5,616,717 A | 4/1997 | Grozinger | |
| 5,654,972 A | 8/1997 | Kuroiwa et al. | |
| 5,664,972 A | 9/1997 | Zinn et al. | |
| 5,755,599 A | 5/1998 | Hotea | |
| 5,868,590 A | 2/1999 | Dobbelaere | |
| 5,941,740 A | 8/1999 | Neuer et al. | |
| 5,975,964 A | 11/1999 | Seko et al. | |
| 5,993,253 A | 11/1999 | Sai | |
| 6,224,428 B1 | 5/2001 | Chen et al. | |
| 6,402,571 B1 | 6/2002 | Muller et al. | |
| 6,475,040 B1 | 11/2002 | Myer et al. | |
| 7,252,559 B1 | 8/2007 | Morello et al. | |
| 7,278,891 B2 | 10/2007 | Cvasa et al. | |
| 7,556,542 B2 | 7/2009 | Lischeck et al. | |
| 7,578,694 B2 | 8/2009 | Takahashi et al. | |
| 7,766,706 B2 | 8/2010 | Kawamura et al. | |
| 7,892,050 B2 * | 2/2011 | Pavlovic | H01R 9/245 439/250 |
| 7,988,481 B2 | 8/2011 | Bethurum et al. | |
| 8,057,261 B1 | 11/2011 | DeSio et al. | |
| 8,182,299 B2 * | 5/2012 | Schrader | H01R 13/113 439/839 |
| 8,202,011 B2 * | 6/2012 | Moore | G02B 6/4201 385/88 |
| 8,282,426 B2 | 10/2012 | Zweigle | |
| 8,339,235 B2 | 12/2012 | Beckert et al. | |
| 8,366,497 B2 | 2/2013 | Glick et al. | |
| 8,475,220 B2 | 7/2013 | Glick et al. | |
| 8,678,867 B2 | 3/2014 | Glick et al. | |
| 2001/0019924 A1 | 9/2001 | Heimueller | |
| 2003/0067242 A1 * | 4/2003 | Konishi | H01R 39/20 310/239 |
| 2006/0040555 A1 | 2/2006 | Chen et al. | |
| 2010/0311280 A1 | 12/2010 | Tin et al. | |
| 2012/0129407 A1 | 5/2012 | Glick et al. | |
| 2013/0045630 A1 | 2/2013 | Natter | |
| 2013/0090009 A1 | 4/2013 | Zhao | |
| 2013/0130530 A1 | 5/2013 | Casses et al. | |
| 2013/0330968 A1 | 12/2013 | Duan | |
| 2014/0235113 A1 | 8/2014 | Glick et al. | |

FOREIGN PATENT DOCUMENTS

| | | |
|---|---|---|
| DE | 10019241 A1 | 10/2001 |
| DE | 69934065 T2 | 6/2007 |
| DE | 9601544 B4 | 3/2009 |
| DE | 10021972 B4 | 3/2009 |
| EP | 0282624 A2 | 9/1988 |
| GB | 2323221 A | 9/1998 |
| JP | 10125378 A | 5/1998 |
| JP | 2011238399 A | 11/2011 |
| WO | 89/05531 A1 | 6/1989 |
| WO | 2014/063142 A1 | 4/2014 |

* cited by examiner

ELECTRICAL TERMINAL

CROSS-REFERENCE TO RELATED APPLICATIONS

This application claims the benefit of U.S. Provisional Application No. 61/716,000, filed Oct. 19, 2012, the disclosure of which is incorporated herein by reference.

BACKGROUND OF THE INVENTION

This invention relates in general to electrical terminals for electrical connectors such as those used for electric and hybrid vehicles. Electrical connectors commonly have a housing made of plastic or other non-conducting material. Disposed in the housing are one or more male or female electrical terminals. The connectors with female terminals are connected with connectors with male pins such that the mating pins and terminals provide electrical communication therebetween. The pin may be shaped in the form of a bar, cylinder, or plate that can slide into the terminal to make contact therewith. Female electrical terminals are commonly formed from a stamped metallic blanks formed to include one or more resilient arms which engage with the outer edges of the pin to provide electrical communication therebetween. It is often important to make sure that the electrical terminals are properly placed within the housing such that a platform or wire connector of the terminal is properly oriented.

SUMMARY OF THE INVENTION

This invention relates to electrical terminals and, in particular, to an electrical terminal assembly including a connector body having a passageway formed therein and an electrical terminal. The electrical terminal includes a contact portion having a contact arm and a spring arrangement having a spring arm engaged with the contact arm. The electrical terminal assembly further includes a one way installation feature preventing the electrical terminal from being inserted into the passageway in an incorrect orientation.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
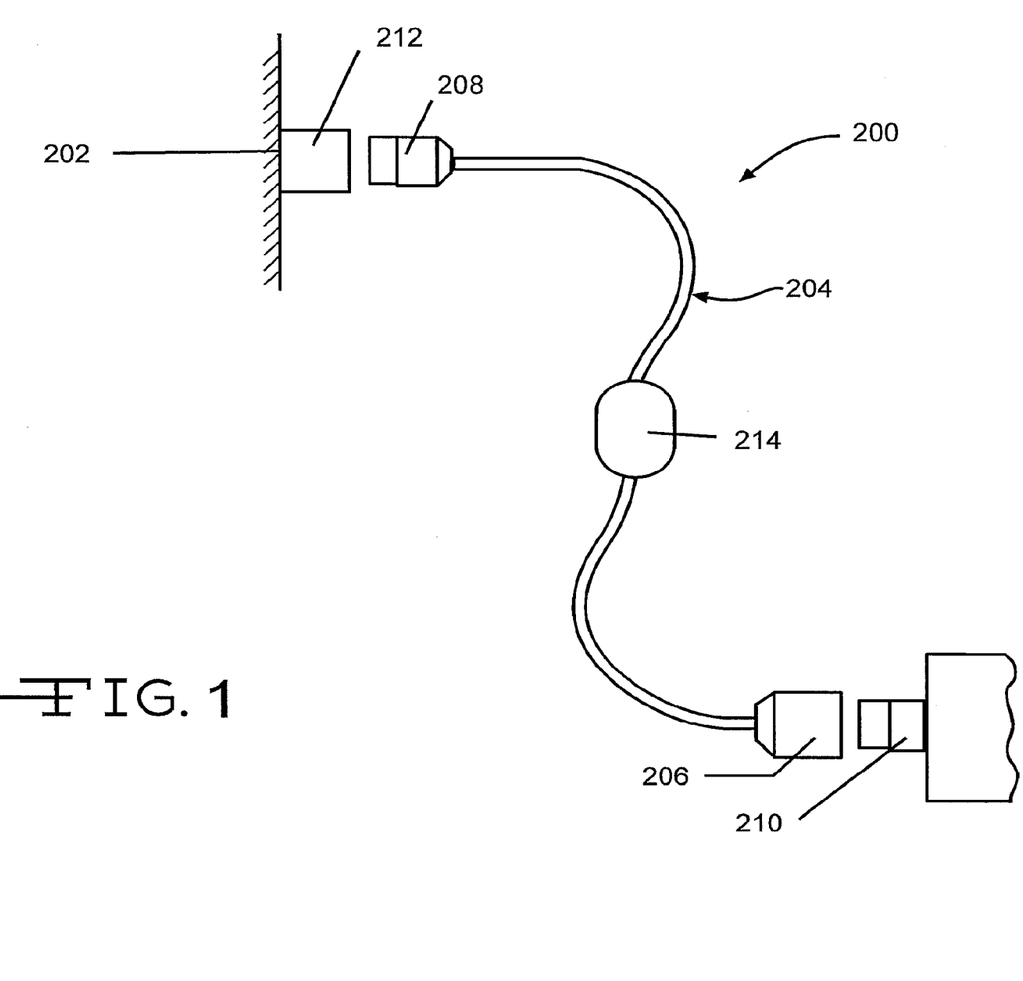
FIG. 1 is a schematic view of an electrical charging cord assembly.

Referring now to the drawings, there is illustrated in FIG. 1 an electrical charging cord assembly, indicated generally at 200. As will be described below, various electrical terminals shown and described with respect to FIGS. 2 through 15 may be used in various components of the charging cord assembly 200. It should also be understood that the charging cord assembly 200 is merely an example of a suitable system which may use the electrical terminals as described herein, and that the electrical terminals may be used in any other suitable electrical charging cord assembly.

The electrical charging cord assembly 200 may be used for electrical vehicles or hybrid vehicles (e.g., plug-in hybrid) which are charged by a remote electrical supply 202. For example, the electrical supply 202 may be installed and mounted within a residential garage or may be part of a charging station to provide electrical power for charging batteries of the electric or hybrid vehicle. The batteries within the vehicle may receive and store electrical energy from the external electrical supply 202. The electrical charging cord assembly 200 includes a charging cord, indicated generally at 204. The charging cord 204 is a flexible electrical cable having a vehicle connector 206 on one end and a plug 208 on the other end. The vehicle connector 206 mates with a vehicle inlet 210 to provide electrical communication between the charging cord 204 and the vehicle. The vehicle inlet 210 is in electrical communication with the batteries and other electrical components of the vehicle. The plug 208 mates with a socket outlet 212 of the electrical supply 202 to provide electrical communication between the charging cord 204 and the electrical supply 202. A single or multiple electrical terminals, as described herein with respect to FIGS. 2 through 15, may be housed in the vehicle connector 206, the plug 208, the vehicle inlet 210, and/or the socket outlet 212 to facilitate electrical connections between respective mating components. The electrical terminals are configured to mate with a connector, such as an electrical pin, which may be repeatedly inserted and removed from engagement with the electrical terminal.

The charging cord 204 may also include an in-cable control box 214 connected between the ends of the charging cord 204. The control box 214 may house various electrical components for controlling and regulating various aspects of the electrical current or voltage traveling through the charging cord 204. For example, the control box 214 may include features such as ground fault protection and monitoring, charger circuit interrupt devices, and indicator lights.

Figure 2:
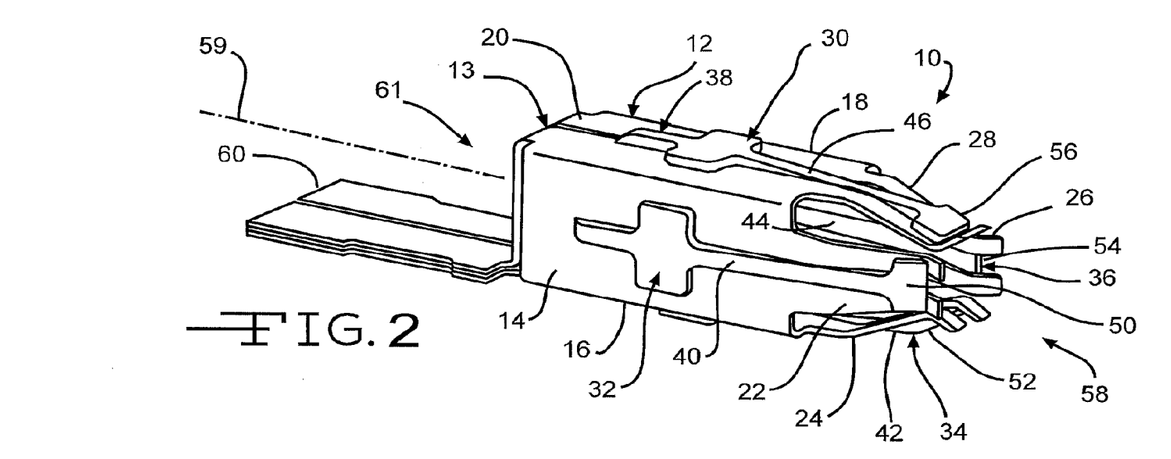
FIG. 2 is a perspective view of a first embodiment of an electrical terminal.

FIG. 2 shows a perspective view of an electrical terminal, indicated generally at 10. The terminal 10 includes a contact portion 12 having a contact portion base 13 having sides 14, 16, 18, 20 forming a generally rectangular structure. The contact portion 12 further includes four pairs of contact arms 22, 24, 26, 28, each extending from a respective one of the sides 14, 16, 18, 20. As described in more detail below, the pairs of contact arms 22, 24, 26, 28 are arranged to receive a mating electrical component, such as a round or square pin 66, such that each pair of contact arms 22, 24, 26, 28 contacts the mating electrical component.

The terminal 10 also includes a spring arrangement 30 that includes four spring arms 32, 34, 36, 38. Each of the spring arms 32, 34, 36, 38 has a respective spring body 40, 42, 44, 46 disposed along a central portion of a respective pair of the contact arms 22, 24, 26, 28. Each of the spring arms 32, 34, 36, 38 also includes a respective spring head 50, 52, 54, 56 in contact with a respective pair of the contact arms 22, 24, 26, 28 near a distal end 58 of the contact portion 12. The spring heads 50, 52, 54, 56 apply a force to the respective pair of contact arms 22, 24, 26, 28 in a direction that is toward an opposite pair of the contact arms—e.g., the spring head 56 applies a force to the contact arms 28 in a direction toward the opposite pair of contact arms 24; similarly, the contact head 34 applies a force to the contact arms 24 in a direction toward the opposite pair of contact arms 28. As explained in more detail below, the configuration of the spring arrangement, and in particular the contact of the spring heads to the respective pairs of contact arms, increases the retention force that will be applied to a mating electrical component, such as a pin.

Although the embodiment shown in FIG. 2 is a four-sided generally rectangular structure, embodiments of the present invention may include less than or more than four sides to create a different type of generally polyhedron structure. For example, a three-sided structure may have a generally triangular cross section, and a five-sided-structure may have a generally pentagonal cross section. In such a case, a spring would not apply a force to a set of contact arms in a direction toward an opposite pair of contact arms since the above examples have an odd number of sides. Regardless of the number of sides, however, the springs will apply a force toward the respective contact arms in a direction toward a central axis of the terminal, such as the axis 59 shown in FIG. 2.

A terminal, such as the terminal 10 may be effective for use in high current applications, where a soft copper conductor may lose its retention force in the presence of the potentially high heat associated with some high current applications. To help avoid this problem, some prior art electrical terminals use a copper alloy that may have better high-temperature properties; however, this is often to the detriment of the conductivity which may be better with a more pure copper or with a softer copper alloy. In the electrical terminal shown in FIG. 2, the contact portion 12 can be made from a relatively soft copper material, such as C151, while the spring arrangement 30 can be made from a relatively stiff and strong steel, such as 301 stainless steel.

Although the tension applied to the contact arms 22, 24, 26, 28 by the spring heads 50, 52, 54, 56 would usually be adequate to keep the components in their relative orientations, the embodiment shown in FIG. 2 provides an additional feature to further ensure that the relative orientation is maintained. As shown in FIG. 2, each of the spring bodies 40, 42, 44, 46 has at least a portion disposed between a respective pair of the contact arms 22, 24, 26, 28, which helps to ensure that the spring heads 50, 52, 54, 56 are in the proper position and apply the force fairly equally between each of the respective contact arms in the pairs of contact arms 22, 24, 26, 28.

Also shown in FIG. 2, the contact portion 12 includes a platform 60 configured to connect with a wire or other electrical component, for example, by sonic welding. The platform 60 extends from a proximal end 61 of the contact portion 12. The platform 60 can have any suitable shape for mating with a wire or other electrical component and can extend from any of the sides 14, 16, 18, 20 (or combination of sides 14, 16, 18, 20) of the contact portion 12.

Figure 3:
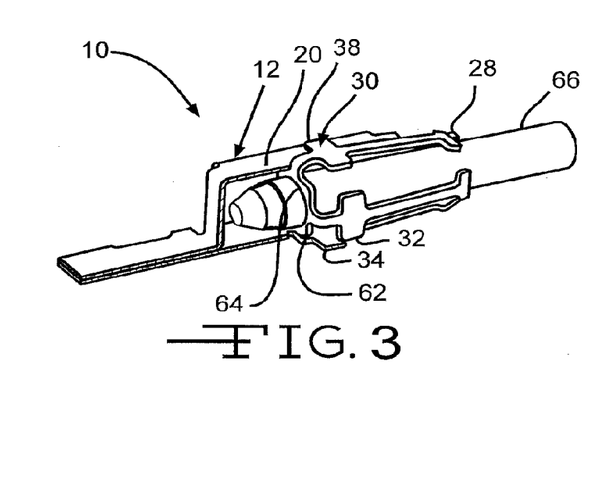
FIG. 3 is a perspective view of the electrical terminal of FIG. 1, wherein the contact portion is shown partially broken away.

FIG. 3 shows a fragmentary view of the electrical terminal 10 shown in FIG. 1. In addition to the spring arms, and respective spring bodies and spring heads, the spring arrangement 30 includes a spring base 62, from which each of the spring arms 32, 34, 36, 38 (see also FIG. 1) extends outward. The spring base 62 and the spring arms 32, 34, 36, 38 are, in this embodiment, made from a single piece of material. The spring base 62 includes an aperture 64 disposed therethrough for receiving a mating electrical component, such as the round pin 66. The aperture 64 is sized to receive the pin 66 with a desirable frictional slide fit such that sufficient electrical contact is made yet permitting the pin 66 to be retracted from the aperture 64 of the spring base 62. This configuration helps to support the pin 66 and allows the terminal 10 to mate with much longer pins than might otherwise be possible. That is, if the only contact between the pin 66 and the electrical terminal 10 was at the pairs of contact arms 22, 24, 26, 28 (see FIG. 2), an undesirable amount of relative motion between the pin 66 and the terminal 10 could occur. Having a spring base 62 configured with the aperture 64 provides the additional support required to reduce this relative motion and thus allow the terminal 10 to interface with longer pins, such as the pin 66.

Figure 4:
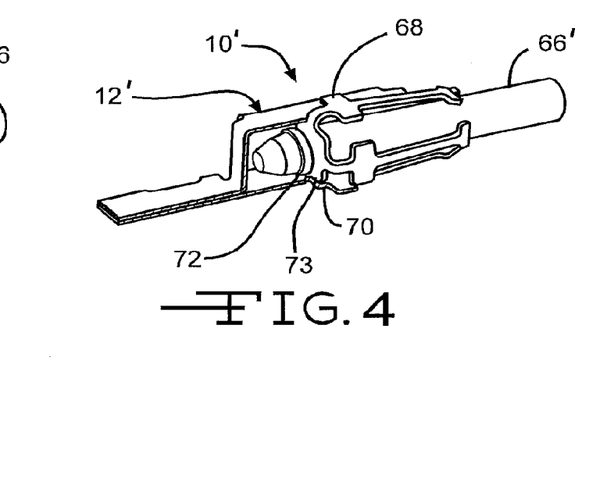
FIG. 4 is a perspective view of a second embodiment of an electrical terminal, wherein the contact portion is shown partially broken away.

There is illustrated in FIG. 4 a second embodiment of an electrical terminal, indicated generally at 10', having a contact portion 12'. The prime symbol (') is used to indicate features similar to those shown in the other drawing figures. A spring arrangement 68 includes a spring base 70 having an aperture 72 therethrough, but in this embodiment, the aperture includes a neck 73, which may be formed, for example, through a drawing process. This configuration provides additional support for the pin 66', and may further strengthen the spring arrangement 68. The configuration of the aperture 72 and the neck 73 provides the ability to accommodate for longer engagement between the pin 66 and the spring base 62 and allows the pin 66 to pass through the back plane of the spring base 62. Also shown in FIG. 4 is that the spring base 70 is disposed within the contact portion base 12, and the spring arms 32, 34, 36, 38 extend through the contact portion base 12 and along an outside of a respective pair of contact arms (see also FIG. 2). A similar configuration is shown in FIG. 3 with the terminal 10'.

Figure 5:
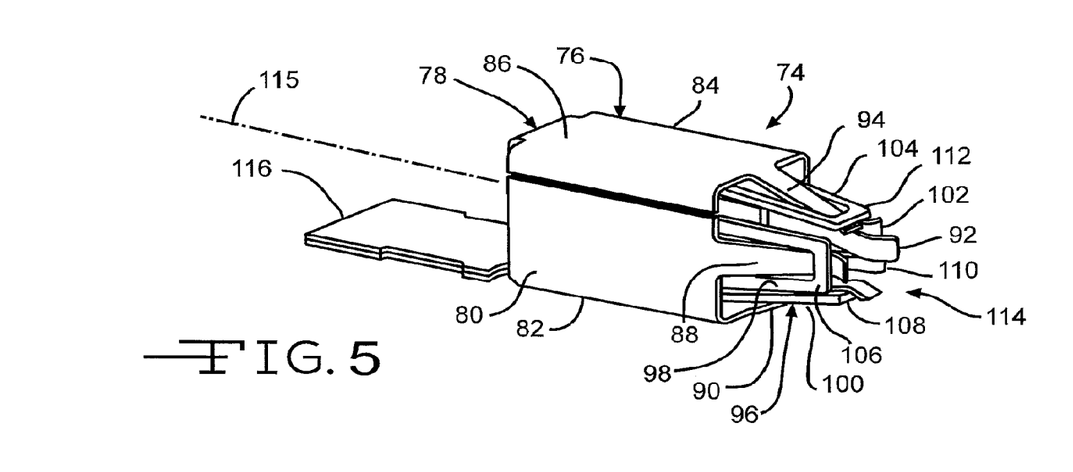
FIG. 5 is a perspective view of a third embodiment of an electrical terminal.

FIG. 5 shows a perspective view of a third embodiment of an electrical terminal, indicated generally at 74. The terminal 74 includes a contact portion 76 having a contact portion base 78 and four sides 80, 82, 84, 86 forming a generally rectangular structure. The contact portion 78 further includes four contact arms 88, 90, 92, 94. As described above with regard to the embodiment shown in FIG. 2, the terminal 74 shown in FIG. 5 may also have fewer than or more than four sides, with each having its own contact arms extending therefrom. The terminal 74 also includes a spring arrangement 96, which has four spring arms 98, 100, 102, 104. Each of the spring arms 98, 100, 102, 104 is made up of two individual elongate members which straddle a respective one of the contact arms 88, 90, 92, 94, and which terminates in a spring head 106, 108, 110, 112.

The spring heads 106, 108, 110, 112 each contact a respective one of the contact arms 88, 90, 92, 94 near a distal end 114 of the terminal 74 and apply a force in a direction toward an opposite one of the contact arms 88, 90, 92, 94. More generally, each of the spring heads 106, 108, 110, 112 applies a force to a respective one of the contact arms 88, 90, 92, 94 in a direction toward a central axis 115 of the terminal 74. Like the terminal 10 shown in FIG. 1, the terminal 74 includes a platform 116 configured to connect with a wire or other electrical component, for example, by sonic welding.

Figure 6:
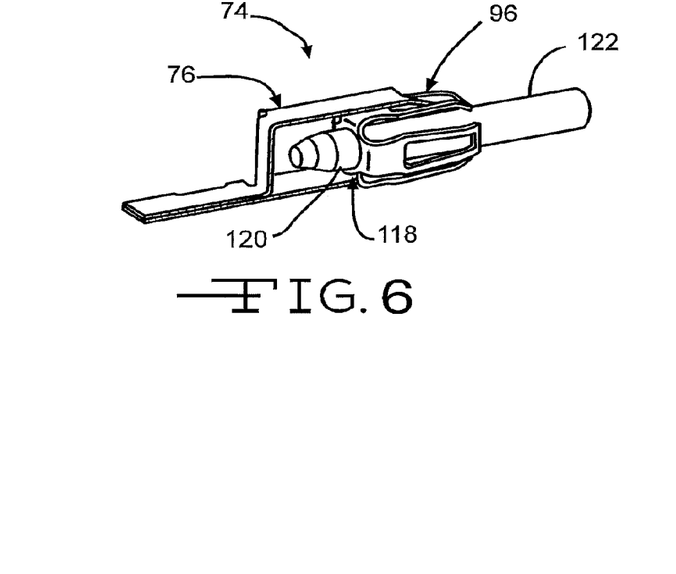
FIG. 6 is a perspective view of the electrical terminal of FIG. 5, wherein the contact portion is shown partially broken away.

There is illustrated in FIG. 6 a fragmentary view of the electrical terminal 74 shown in FIG. 3. In addition to the spring arms, and respective spring heads (not labeled in FIG. 6), the spring arrangement 96 includes a spring base 118, from which each of the spring arms 98, 100, 102, 104 (see also FIG. 5) extends outward. The spring base 118 and the spring arms 98, 100, 102, 104 are, in this embodiment, made from a single piece of material. The spring base 118 includes an aperture 120 disposed therethrough for receiving a mating electrical component, such as the round pin 122. The aperture 120 is sized to receive the pin 122 with a desirable frictional slide fit such that sufficient electrical contact is made yet permitting the pin 122 to be retracted from the aperture 120 of the spring base. This configuration helps to support the pin 122 and allows the terminal 74 to mate with much longer pins than might otherwise be possible.

Figure 7:
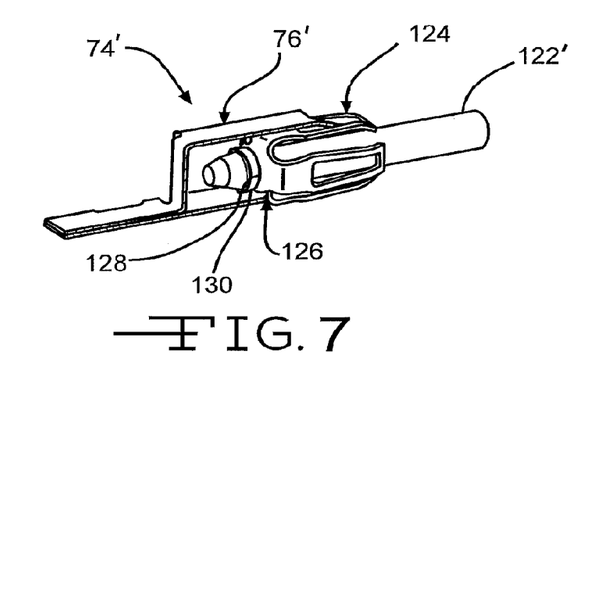
FIG. 7 is a perspective view of a fourth embodiment of an electrical terminal, wherein the contact portion is shown partially broken away.

There is illustrated in FIG. 7 a fourth embodiment of an electrical terminal, indicated generally at 74', having a contact portion 76'. A spring arrangement 124 includes a spring base 126 having an aperture 128 therethrough. In this embodiment, the aperture 128 includes a neck 130, which may be formed, for example, through a drawing process. This configuration provides additional support for the pin 122', and may further strengthen the spring arrangement 124. The configuration of the aperture 128 and the neck 130 provides the ability to accommodate for longer engagement between the pin 122' and the spring base 126 and allows the pin 122' to pass through the back plane of the spring base 118.

Figure 8:
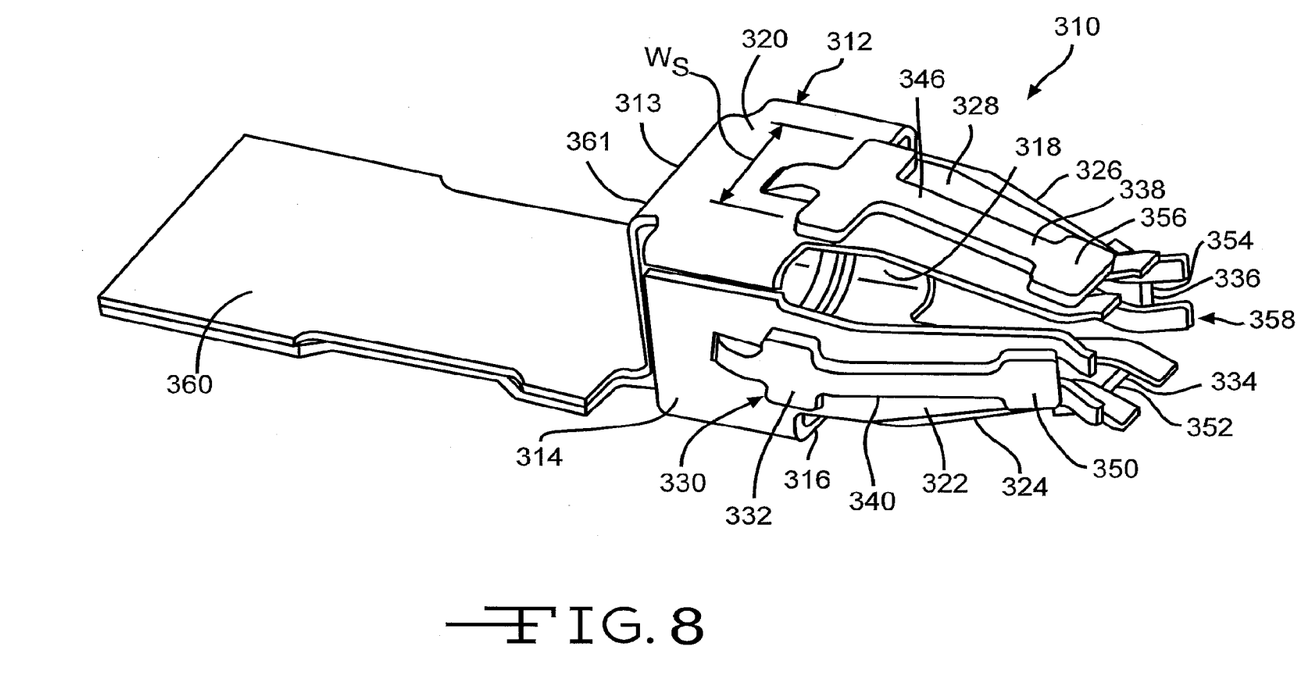
FIG. 8 is a perspective view of a fifth embodiment of an electrical terminal.

There is illustrated in FIG. 8 a fifth embodiment of an electrical connector, indicated generally at 310. The terminal 310 is similar to the terminal 10 illustrated in FIGS. 2 and 3 with one of the differences being a shorter length to provide for a low profile design and to improve packaging options. The terminal 310 includes a contact portion 312 having a contact portion base 313 having sides 314, 316, 318, 320 forming a generally rectangular structure. The contact portion 312 further includes four pairs of contact arms 322, 324, 326, 328, each extending from a respective one of the sides 314, 316, 318, 320. The pairs of contact arms 322, 324, 326, 328 are arranged to receive a mating electrical component, such as a round or square pin, such that each pair of contact arms 322, 324, 326, 328 contacts the mating electrical component.

The terminal 310 also includes an external spring arrangement 330 that includes four spring arms 332, 334, 336, 338. Each of the spring arms 332, 334, 336, 338 has a respective spring body 340, 342, 344, 346 disposed along a central portion of a respective pair of the contact arms 322, 324, 326, 328. Each of the spring arms 332, 334, 336, 338 also includes a respective spring head 350, 352, 354, 356 in contact with a respective pair of the contact arms 322, 324, 326, 328 near a distal end 358 of the contact portion 312. The spring heads 350, 352, 354, 356 apply a force to the respective pair of contact arms 322, 324, 326, 328 in a direction that is toward an opposite pair of the contact arms—e.g., the spring head 356 applies a force to the contact arms 328 in a direction toward the opposite pair of contact arms 324; similarly, the contact head 334 applies a force to the contact arms 324 in a direction toward the opposite pair of contact arms 328. The configuration of the spring arrangement, and in particular the contact of the spring heads to the respective pairs of contact arms, increases the retention force that will be applied to a mating electrical component, such as a pin.

Also shown in FIG. 8, the contact portion 312 includes a platform 360 configured to connect with a wire or other electrical component, for example, by sonic welding. The platform 360 extends from a proximal end 361 of the contact portion 312. The platform 360 can have any suitable shape for mating with a wire or other electrical component and can extend from any of the sides 314, 316, 318, 320 (or combination of sides 314, 316, 318, 320) of the contact portion 312.

Figure 9:
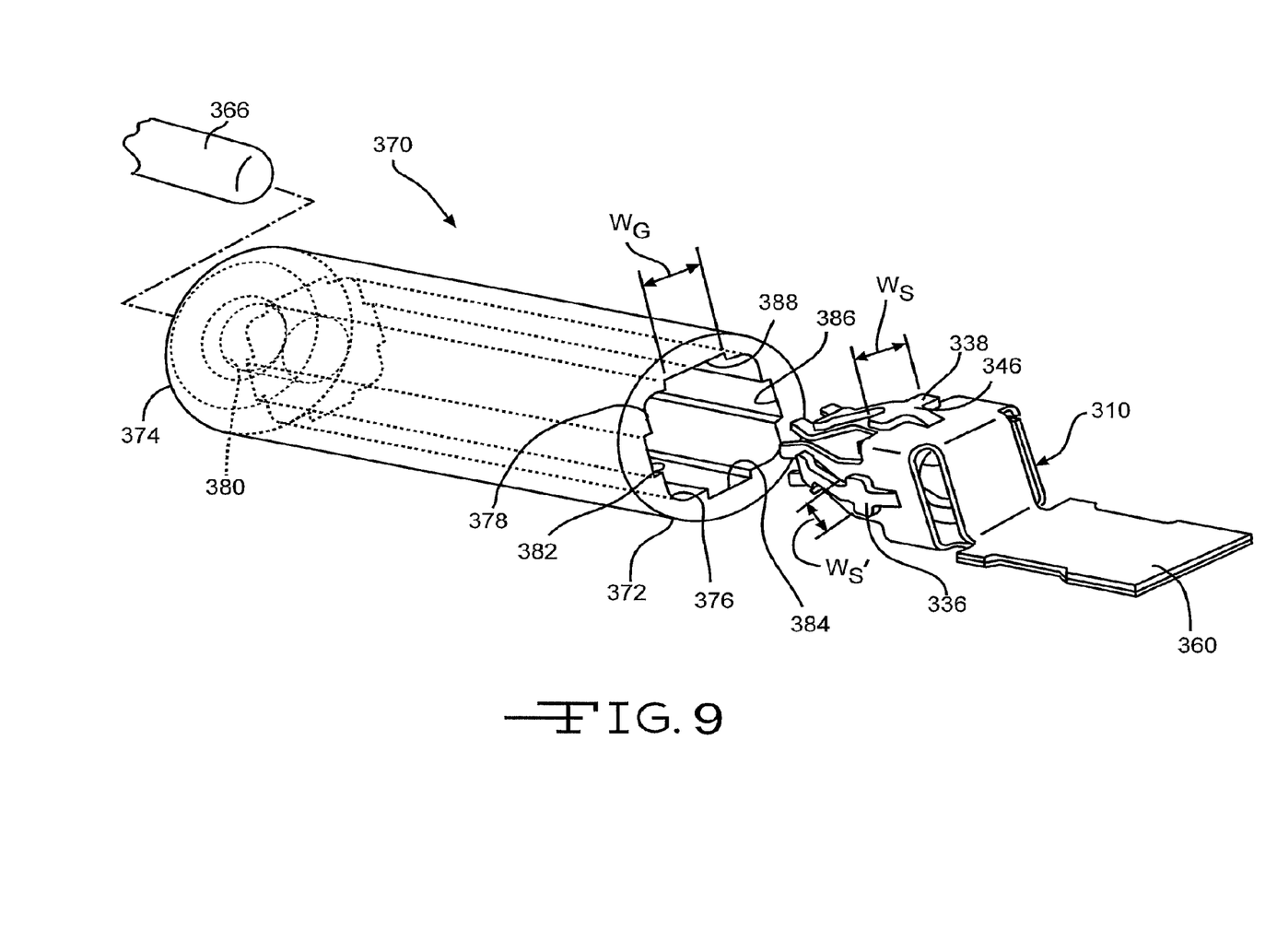
FIG. 9 is a perspective view of the electrical terminal of FIG. 8 shown prior to insertion into a connector body.
Figure 10:
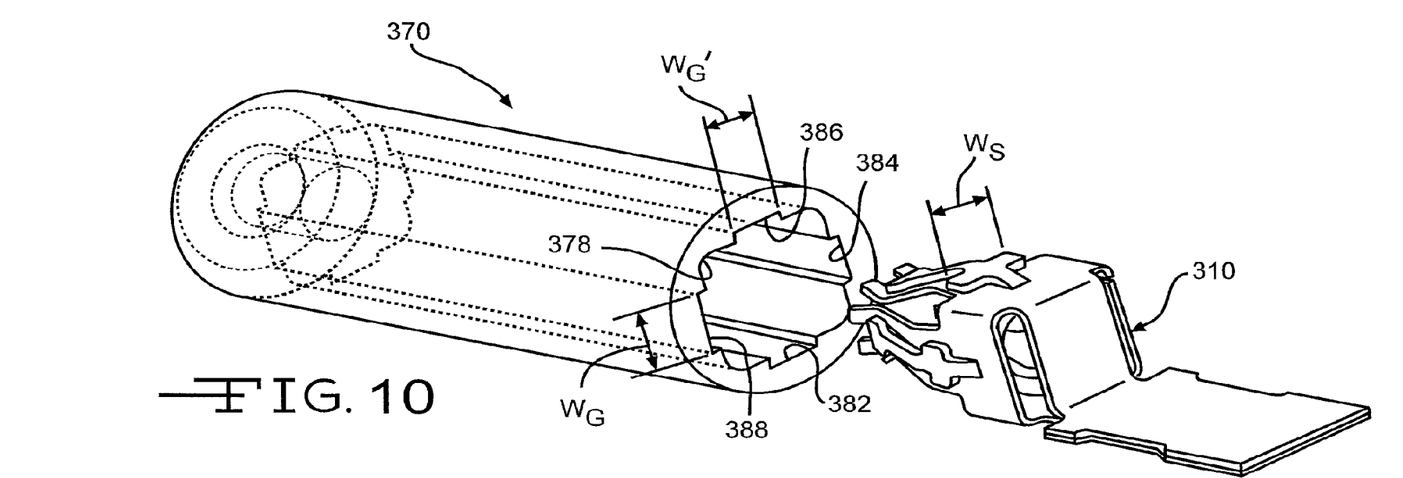
FIG. 10 is a perspective view of the electrical terminal of FIG. 8 shown prior to an attempted insertion into a connector body but oriented incorrectly.
Figure 11:
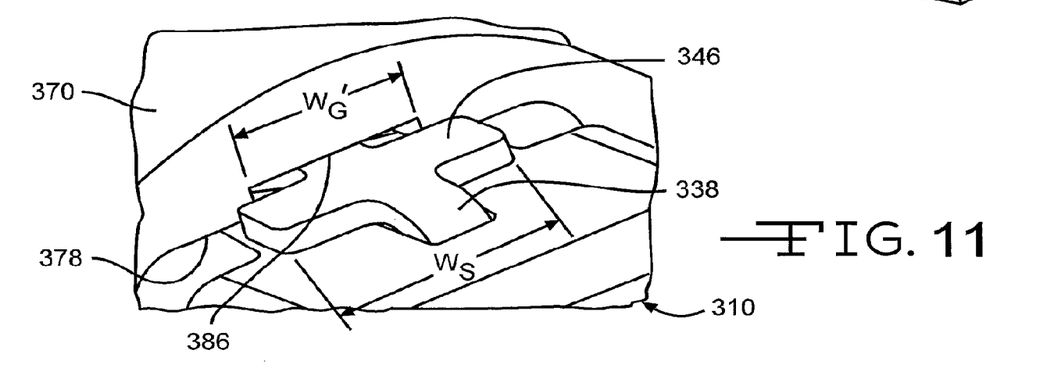
FIG. 11 is an enlarged perspective view of the electrical terminal and connector body of FIG. 10 illustrating the attempted incorrect installation.

The terminal 310 may include a polarity or one way installation feature such that the terminal 310 is installed into a connector body in a proper or desired orientation. For example, as illustrated in FIG. 9, a connector body 370 receives the terminal 310 when properly installed therein. It should be understood that although the connector body 370 is shown configured to receive a single terminal 310, the connector body 370 can be configured to receive any number of terminals 310. The connector body 370 may be for example, a portion of the vehicle connector 206, the plug 208, the vehicle inlet 210, and/or the socket outlet 212. The connector body 370 includes first and second ends 372 and 374. The connector body may be made of plastic or other non-conductive material. The connector body 370 includes a passageway 376 formed therethrough. The passageway 376 defines a first opening 378 at the first end 372 of the connector body 370, and a second opening 380 at the second end. To install the terminal 310, the terminal 310 is inserted into the first opening 378 as shown in FIG. 9. However, the shape of the first opening 378 is unsymmetrical such that the terminal 310 fits within the passageway 376 in a predetermined or desired orientation. In the embodiment of the connector body 370 illustrated in FIG. 9, the passageway 376 includes four grooves 382, 384, 386, and 388 formed therein. The groove 388 has a width $W_G$ which is greater than the widths $W_G'$ of the other three grooves 382, 384, and 386. The spring body 346 of the spring arm 338 has a portion having a width $W_S$ which is greater than the widths $W_S'$ of the other three spring bodies 340, 342, and 344 of the spring arms 332, 334, and 336. The width $W_G$ of the groove 388 is preferably the same size or slightly greater than the width $W_S$ of the spring body 346. As shown in FIGS. 10 and 11, attempting to install the terminal 310 incorrectly, for example aligning the spring arm 388 with the groove 386 (or the grooves 382 and 384) creates an interference such that the terminal 310 cannot be inserted into the passageway 378 of the connector body 370. More specifically, the width $W_S$ of the spring body 346 of the spring arm 338 is greater than the width $W_G'$ of the groove 386.

Figure 12:
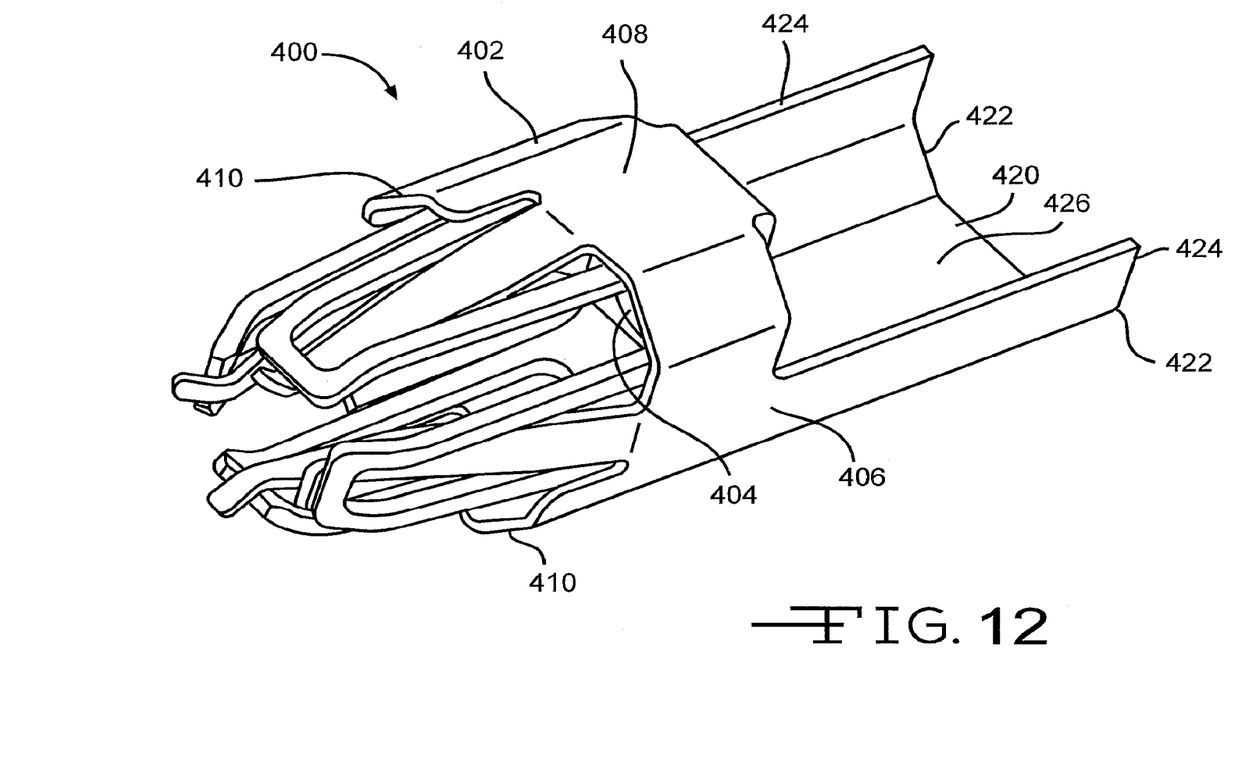
FIG. 12 is a perspective view of a sixth embodiment of an electrical terminal.

There is illustrated in FIG. 12, a sixth embodiment of an electrical terminal, indicated generally at 400. The terminal 400 is similar to the terminals 74 and 74' of FIGS. 5 through 7. One of the differences is that the terminal 400 includes a polarity or one way installation feature by altering the shape of a contact portion 402 making it unsymmetrical. In the embodiment shown in FIG. 12, the contact portion 402 has a notch 404 formed in a corner between two adjacent sides 406 and 408. The other three corners 410 of the contact portion do not have a corresponding notch. A connector body (not shown) can have corresponding features such that the terminal 400 may only be inserted in one of the four orientations. For example, a single groove formed in the passageway of the connector body may be shaped to only accept the notch 404. Thus, it should be understood that the polarity or one way feature may be formed and utilized in any suitable portion of the electrical terminal and/or connector body and is not limited to the specific examples shown herein.

Another difference of the electrical terminal 400 relative to the terminals 74 and 74', is the shape and configuration of a platform 420. Instead of a relatively flat plate, the platform 420 includes corner portions 422 and side portions 424 extending from a base portion 426. The configuration of the platform 420 may accommodate wires, connectors or other electrical components (not shown) electrically communicating with the contact portion 402 of the terminal 400.

Figure 13:
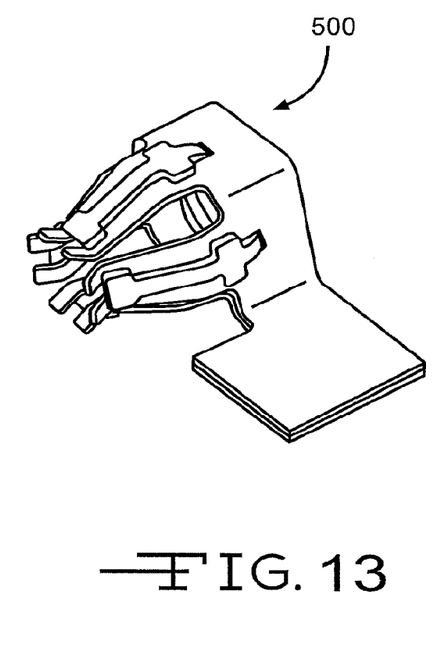
FIG. 13 is a perspective view of a seventh embodiment of an electrical terminal.
Figure 14:
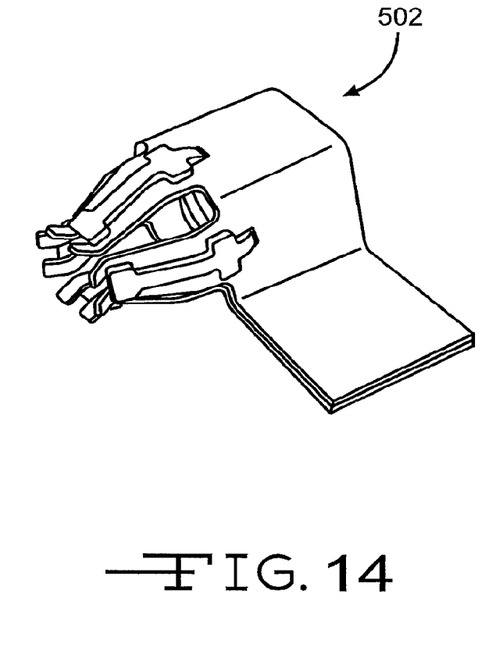
FIG. 14 is a perspective view of an eighth embodiment of an electrical terminal.
Figure 15:
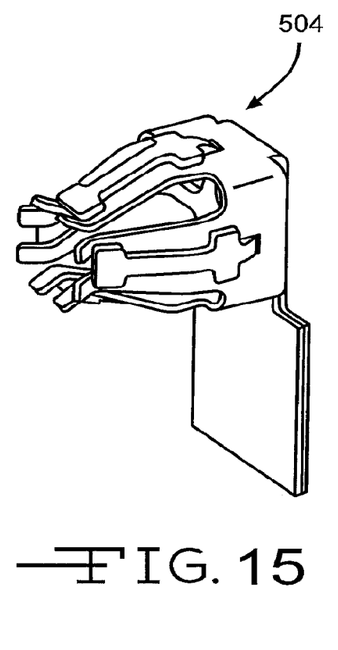
FIG. 15 is a perspective view of a ninth embodiment of an electrical terminal.

There is illustrated in FIGS. 13 through 15, seventh, eighth, and ninth embodiments of electrical terminals 500, 502, and 504, respectively. The terminals 500, 502, and 504 have differently shaped platforms extending in other directions compared to the rearwardly extending platforms shown in FIGS. 2 through 12. It is noted that the terminals have a low profile configuration such that they are shorter in length compared to the terminals 10 and 74. It should be understood that the electrical terminals can be configured with a platform or platforms having any suitable shape and extending from any desired side or corner of the contact portion.

It should be understood that the he terminal 310 and the connector body 380 may be configured in any suitable mating manner which provides for the polarity or one way installation feature.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A combined connector body and electrical terminal assembly comprising:
a connector body having a passageway formed therein that includes an installation feature; and
an electrical terminal including a contact portion having a contact arm, a spring arrangement having a spring arm engaged with the contact arm, and a one way installation feature provided on the spring arm that is engaged with the installation feature provided in the passageway of the connector body to prevent the electrical terminal from being inserted into the passageway in an incorrect orientation relative to the connector body.

2. The combined connector body and electrical terminal assembly of claim 1, wherein the installation feature provided in the passageway of the connector body is defined by an unsymmetrical opening of the passageway of the connector body.

3. The combined connector body and electrical terminal assembly of claim 2, wherein the electrical terminal includes a plurality of spring arms, and wherein a first spring arm differs in dimension relative to the other spring arms such that the electrical terminal may only be inserted in the passageway in one orientation relative to the connector body.

4. The combined connector body and electrical terminal assembly of claim 3, wherein the passageway includes a plurality of grooves corresponding to the plurality of spring arms of the electrical terminal, a first groove differs in dimension relative to the other grooves, and the one way installation feature is defined by the insertion of the first spring arms within the first groove.

5. A combined connector body and electrical terminal assembly comprising:
a connector body having a passageway formed therein that includes an installation feature; and
an electrical terminal including a contact portion having a contact arm, a spring arrangement having a spring arm engaged with the contact arm, and a one way installation feature having an unsymmetrical shape provided on the contact portion that is engaged with the installation feature provided in the passageway of the connector body to prevent the electrical terminal from being inserted into the passageway in an incorrect orientation relative to the connector body.

6. The combined connector body and electrical terminal assembly of claim 5, wherein unsymmetrical shape provided on the contact portion includes a notch.

7. The combined connector body and electrical terminal assembly of claim 6, wherein the contact portion includes a plurality of sides, and wherein the notch is formed in only one of the sides of the contact portion.

8. The combined connector body and electrical terminal assembly of claim 7, wherein the contact portion is formed from a metallic blank.

9. The combined connector body and electrical terminal assembly of claim 8, wherein the contact portion includes a platform extending from one side thereof.

10. The combined connector body and electrical terminal assembly of claim 9, wherein the platform is flat.

11. The combined connector body and electrical terminal assembly of claim 9, wherein the platform includes side portions extending from a flat base portion.

12. The combined connector body and electrical terminal assembly of claim 9, wherein the platform extends in a direction normal to an axis of insertion of the terminal into the passageway.

13. A combined connector body and electrical terminal assembly comprising:
a connector body including a passageway and having an installation structure; and
an electrical terminal disposed within the passageway of the connector body, the electrical terminal including a contact portion having a contact arm, a spring arrangement that engages the contact arm of the contact portion, and an installation feature provided on one of the contact arm and the spring arrangement that cooperates with the installation structure provided on the connector body such that the electrical terminal can be disposed within the passageway of the connector body in only a single orientation relative thereto.

14. The combined connector body and electrical terminal assembly of claim 13 wherein the installation structure is a groove provided in the passageway of the connector body.

15. The combined connector body and electrical terminal assembly of claim 13 wherein the installation feature is provided on the spring arrangement of the electrical terminal.

16. The combined connector body and electrical terminal assembly of claim 13 wherein the installation structure is a groove provided in the passageway of the connector body, and wherein the installation feature is provided on the spring arrangement of the electrical terminal.

17. The combined connector body and electrical terminal assembly of claim 13 wherein a plurality of grooves is provided within the passageway of the connector body, and wherein the installation structure is one of the plurality of grooves that is differently shaped from the others of the plurality of grooves.

18. The combined connector body and electrical terminal assembly of claim 17 wherein the installation feature is shaped such that it can cooperate with only the one of the plurality of grooves that is differently shaped from the others of the plurality of grooves.

19. The combined connector body and electrical terminal assembly of claim 17 wherein the installation feature is provided on the spring arrangement of the electrical terminal and is shaped such that it can cooperate only with the one of the plurality of grooves that is differently shaped from the others of the plurality of grooves.

* * * * *